US009723505B2

(12) United States Patent
Baghel et al.

(10) Patent No.: US 9,723,505 B2
(45) Date of Patent: Aug. 1, 2017

(54) METHOD AND SYSTEM FOR HANDLING IN-DEVICE CO-EXISTENCE INTERFERENCE IN USER EQUIPMENT

(71) Applicant: Samsung Electronics Co., Ltd., Suwon-si, Gyeonggi-do (KR)

(72) Inventors: Sudhir Kumar Baghel, Bangalore (IN); Mangesh Abhimanyu Ingale, Bangalore (IN); Venkateswara Rao Manepalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/363,046

(22) PCT Filed: Dec. 4, 2012

(86) PCT No.: PCT/KR2012/010437
§ 371 (c)(1),
(2) Date: Jun. 5, 2014

(87) PCT Pub. No.: WO2013/085256
PCT Pub. Date: Jun. 13, 2013

(65) Prior Publication Data
US 2014/0334330 A1    Nov. 13, 2014

(30) Foreign Application Priority Data
Dec. 5, 2011    (IN) ............................ 4238/CHE/2011

(51) Int. Cl.
*H04W 74/08*    (2009.01)
*H04W 24/10*    (2009.01)
(Continued)

(52) U.S. Cl.
CPC ............. *H04W 24/10* (2013.01); *H04L 1/188* (2013.01); *H04W 16/14* (2013.01); *H04W 72/1215* (2013.01); *H04W 88/06* (2013.01)

(58) Field of Classification Search
CPC ............. H04W 24/10; H04W 72/1215; H04W 16/14; H04W 88/06; H04L 1/188
See application file for complete search history.

(56) References Cited

U.S. PATENT DOCUMENTS 8,917,619 B2 * 12/2014 Ahn .......................... H04B 7/26
370/252
8,995,359 B2 * 3/2015 Dayal ............... H04W 36/0055
370/329
(Continued)

FOREIGN PATENT DOCUMENTS

CN    102158869 A    8/2011
CN    102170644 A    8/2011
(Continued)

OTHER PUBLICATIONS

Samsung, "Possible FDM Solution for In-device Coexistence Interference Mitigation", 3GPP Draft, R2-1055733, Oct. 5, 2010.
(Continued)

*Primary Examiner* — Phuc Tran
(74) *Attorney, Agent, or Firm* — Jefferson IP Law, LLP

(57) ABSTRACT

A method and a system for handling in-device coexistence interference in a user equipment are provided. The method includes detecting in-device coexistence interference between one or more of a plurality of carrier frequencies of Long Term Evolution (LTE) radio technology and at least one frequency of non-LTE radio technologies, determining at least one of the one or more of the plurality of LTE carrier frequencies for which a measurement object is configured, and transmitting interference information associated with the at least one LTE carrier frequency affected by the
(Continued)

in-device coexistence interference. The interference information includes a measurement object identifier of the at least one carrier LTE frequency, Direction of Interference (DOI), and time domain multiplexing assistance information. The method further includes receiving a configured method from the network entity which help mitigate the in-device coexistence interference at the user equipment.

12 Claims, 8 Drawing Sheets

(51) Int. Cl.
*H04W 16/14* (2009.01)
*H04W 72/12* (2009.01)
*H04L 1/18* (2006.01)
*H04W 88/06* (2009.01)

(56) References Cited

U.S. PATENT DOCUMENTS

| | | | |
|---|---|---|---|
| 9,060,280 B2* | 6/2015 | Koo | H04W 16/14 |
| 2009/0088160 A1 | 4/2009 | Pani et al. | |
| 2010/0136998 A1 | 6/2010 | Lott et al. | |
| 2010/0203832 A1 | 8/2010 | Russell et al. | |
| 2011/0158211 A1 | 6/2011 | Gaal et al. | |
| 2011/0243047 A1 | 10/2011 | Dayal et al. | |
| 2011/0243094 A1 | 10/2011 | Dayal et al. | |
| 2012/0020229 A1* | 1/2012 | Dayal | H04W 16/14 370/252 |
| 2013/0029704 A1* | 1/2013 | Koo | H04W 16/14 455/501 |
| 2013/0114515 A1* | 5/2013 | Koo | H04J 11/0023 370/329 |
| 2014/0219216 A1 | 8/2014 | Lee et al. | |

FOREIGN PATENT DOCUMENTS

| | | |
|---|---|---|
| EP | 2315492 A1 | 4/2011 |
| JP | 2011-530251 A | 12/2011 |
| JP | 2013-524641 A | 6/2013 |
| RU | 2010 101 229 A | 7/2011 |
| WO | 2010/025678 A1 | 3/2010 |
| WO | 2011/123534 A1 | 10/2011 |
| WO | 2011/123555 A1 | 10/2011 |

OTHER PUBLICATIONS

CMCC et al.:"Framework and Procedure of In-device Coexistence Interference Avoidance", 3GPP Draft, R2-110391, Jan. 11, 2011.

"3rd Generation Partnership Project; Technical Specification Group Radio Access Network; Evolved Universal Terrestrial Radio Access; Study on Signalling and Procedure for Interference Avoidance for In-device Coexistence (Release 11)", Oct. 2, 2011.

Samsung, "Unified Signalling Approach for In-device Coexistence", 3GPP Draft, R2-116130, Nov. 8, 2011.

Fujitsu, Clarification on the Indication, 3GPP TSG-RAN WG2 Meeting #75, Athens, Greece, Aug. 22-26, 2011, pp. 1-3, R2-114486.

* cited by examiner

METHOD AND SYSTEM FOR HANDLING IN-DEVICE CO-EXISTENCE INTERFERENCE IN USER EQUIPMENT

CROSS-REFERENCE TO RELATED APPLICATION(S)

This application is a National Stage application under 35 U.S.C. §371 of an International application filed on Dec. 4, 2012 and assigned application No. PCT/KR2012/010437, which claims the benefit of an Indian patent application filed on Dec. 5, 2011 in the Indian Intellectual Property Office and assigned Serial number 4238/CHE/2011, the entire disclosure of which is hereby incorporated by reference.

TECHNICAL FIELD

The present disclosure relates to a method and a system of mitigating in-device coexistence interference within a user equipment operating in a wireless network system. More particularly, the present disclosure relates to a method for mitigating in-device coexistence interference in a user equipment operating multiple radios simultaneously.

BACKGROUND

Providing multiple services through a user equipment using multiple radio technologies is one of the advantages of modern communication systems. For example, the user equipment may support multiple communication technologies, such as Long Term Evolution (LTE) radio, Industrial Scientific and Medical (ISM) radio and Global Navigation and Satellite System (GNSS) receiver. LTE is a fourth generation communication technology for high speed and efficient data transfer between the user equipment and other entities in a network. ISM radios include technologies, such as WiFi Bluetooth, and the like, operating in the ISM band. GNSS includes technologies, such as a Global Positioning System (GPS), used for geographical location identification. The user equipment allows simultaneous operation of such technologies in their respective frequency bands for different services.

One of the challenges of such multiple radio technologies co-existing and operating simultaneously within the same user equipment is interference in reception within frequency band of one radio by transmission of another radio within adjacent frequency band. This interference due to simultaneously transmission/reception of multiple radios in the user equipment is referred as In-Device Coexistence (IDC) interference.

Therefore, a need exists for a method and a system of mitigating in-device coexistence interference within a user equipment operating in a wireless network system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a system of mitigating in-device coexistence interference within a user equipment operating in a wireless network system.

In accordance with an aspect of the present disclosure, a method for handling in-device coexistence interference in a user equipment is provided. The method includes detecting in-device coexistence interference between one or more of a plurality of carrier frequencies of Long Term Evolution (LTE) radio technology and at least one frequency of non-LTE radio technologies, determining at least one of the one or more of the plurality of LTE carrier frequencies for which a measurement object is configured, and indicating to a network entity that the at least one LTE carrier frequency is affected by the in-device coexistence interference.

In accordance with an aspect of the present disclosure, a user equipment apparatus of handling in-device coexistence interference is provided. The apparatus includes an LTE module, a non-LTE module, and a coordinator communicatively coupled to the LTE module and the non-LTE module, wherein the coordinator is configured to detect in-device coexistence interference between one or more of a plurality of carrier frequencies associated with the LTE module and at least one frequency associated with the non-LTE module, to determine at least one of the one or more of the plurality of LTE carrier frequencies for which a measurement object is configured, and to indicate to a network entity that the at least one LTE carrier frequency is affected by the in-device coexistence interference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, the terms 'radio frequency interference' and 'in-device coexistence interference' and 'interference' are used interchangeably throughout the detailed description.

Figure 1:
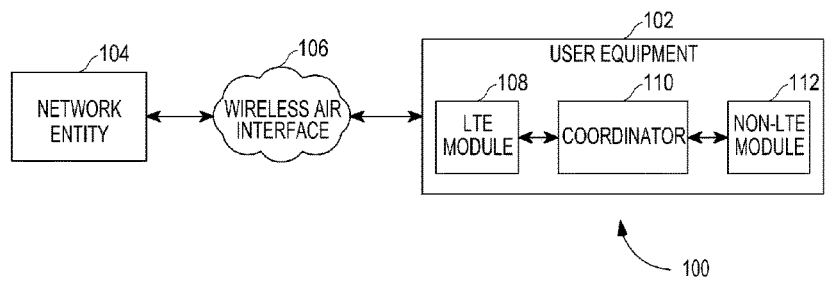
FIG. 1 illustrates a block diagram of a wireless communication system for handling in-device coexistence interference between a Long Term Evolution (LTE) module and a non-LTE Module in a user equipment according to an embodiment of the present disclosure.

FIG. 1 illustrates a block diagram of a wireless communication system for handling in-device coexistence interference between a Long Term Evolution (LTE) module and a non-LTE Module in a user equipment according to an embodiment of the present disclosure.

Referring to FIG. 1, in a wireless operating environment 100, each frequency band is dedicated for a corresponding wireless service.

The wireless operating environment 100 includes a network entity 104 (e.g., an evolved Node B (eNB)) and a User Equipment (UE) 102 connected via a wireless air interface 106 based on the Long Term Evolution (LTE) technology. The UE 102 includes an LTE module 108, a non-LTE module 112, and a coordinator 110. The non-LTE module 112 may be either used for providing short range wireless services, such as WiFi or Bluetooth within the Industrial Scientific and Medical (ISM) frequency band. Alternatively, the non-LTE module may be used for providing geographical location identification and positioning services using Global Navigation Satellite System (GNSS) receiver. The LTE module 108 operates on an LTE carrier frequency while the non-LTE module 112 operates on a non-LTE frequency (e.g., ISM band).

Figure 2:
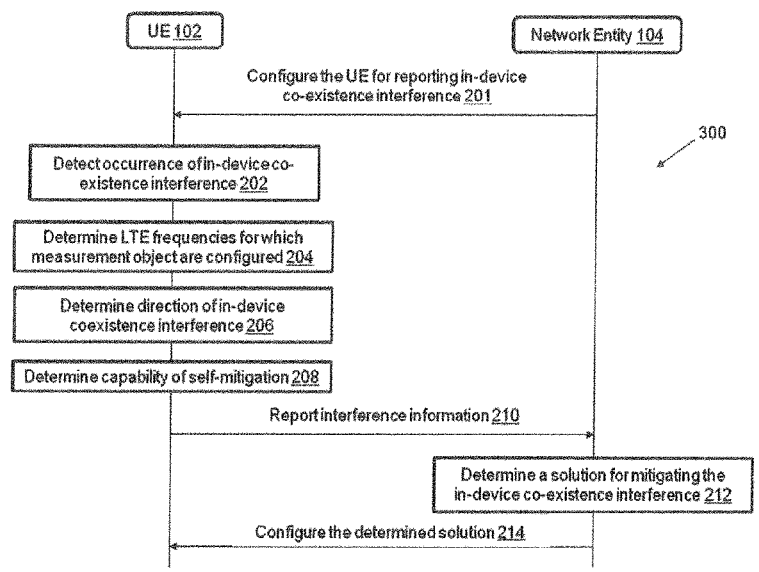
FIG. 2 is a flowchart illustrating a method for handling in-device coexistence interference in a user equipment according to an embodiment of the present disclosure.

According to one embodiment of the present disclosure, the coordinator 110 is configured to handle in-device coexistence interference between LTE carrier frequencies associated with measurement objects and non-LTE carrier frequency by performing the operations illustrated in FIG. 2.

FIG. 2 is a flowchart illustrating a method for handling in-device coexistence interference in a user equipment according to an embodiment of the present disclosure.

The LTE module 108 is configured to perform measurements on one or more measurement objects which represent LTE carrier frequencies among serving or non-serving frequencies and the non-LTE module 112 is configured to operate on a non-LTE frequency. An in-device coexistence interference may occur when both the LTE module 108 and the non-LTE module 112 simultaneously operate on their respective frequencies. The process of handling in-device coexistence interference between carrier frequencies corresponding to measurement objects and non-LTE frequencies is described in following operations 202-214.

Figure 4:
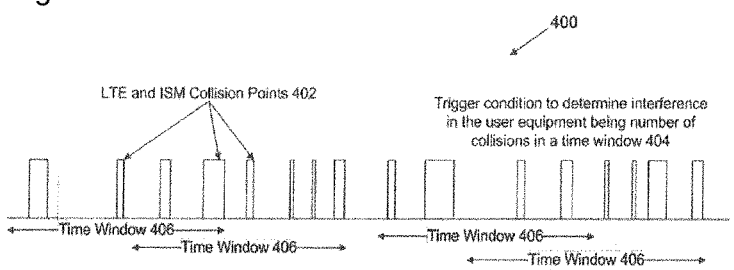
FIG. 4 illustrates one of trigger criterions configured to determine presence of in-device coexistence interference in a user equipment according to an embodiment of the present disclosure.
Figure 5:
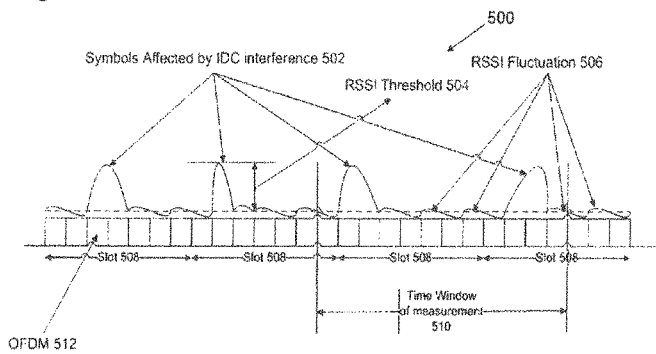
FIG. 5 illustrates a trigger criterion configured to determine presence of in-device coexistence interference in a user equipment according to an embodiment of the present disclosure.

Referring to FIG. 2, at operation 201, the network entity 104 configures the user equipment 102 for reporting the in-device coexistence interference between carrier frequencies corresponding to measurement objects and non-LTE frequencies. In one embodiment, the user equipment 102 is configured to report occurrence of in-device coexistence interference anytime during the connected mode of operation. In another embodiment of the present disclosure, the user equipment 102 is configured to report occurrence of in-device coexistence interference upon transitioning from idle mode to connected mode of operation. In another embodiment of the present disclosure, the user equipment 102 is configured to report in-device coexistence interference after completion of successful handover of the wireless connection from a source base station to a target base station. At operation 202, the user equipment 102 detects occurrence of in-device coexistence interference between one or some of LTE carrier frequencies and a non-LTE frequency during simultaneous operation of the user equipment 102. The conditions for determining presence of in-device coexistence interference in the user equipment 102 are illustrated in FIGS. 4 and 5.

At operation 204, the user equipment 102 determines one or more LTE carrier frequencies among the carrier frequencies for which measurement object is configured suffering from the in-device coexistence interference. At operation 206, the user equipment 102 determines direction of in-device coexistence interference between the determined LTE carrier frequencies and the non-LTE frequency. In various embodiments, the user equipment 102 identifies a victim and an aggressor of the in-device coexistence interference. In various embodiments, the UE 102 sets a value in interference information to indicate direction of in-device coexistence interference to the network entity 104. The value may be 'EUTRA', 'other' and 'both'. For example, the value 'EUTRA' indicates that the victim of in-device coexistence interference are LTE carrier frequencies, the value 'other' indicates that the victim of the in-device coexistence interference is the non-LTE frequency and the value 'both' indicates that both the LTE carrier frequency and the non-LTE frequency are victims of the in-device coexistence interference. Based on the value set, the network entity 104 ascertains the direction of in-device coexistence interference.

It is appreciated that the technique of identifying in-device coexistence interference is well known to the person skilled in the art. At operation 208, the user equipment 102 determines whether the in-device coexistence interference between any of the determined LTE carrier frequencies and the non-LTE frequency can be mitigated by itself.

If the in-device coexistence interference cannot be mitigated, at operation 210, the user equipment 102 reports interference to the network entity 104. The in-device coexistence interference indication to the network entity 104 includes information associated with the LTE carrier frequencies. For example, the user equipment 102 may report a measurement object identifier of the at least one carrier frequency, the Direction Of Interference (DOI), use case scenario in which the in-device coexistence interference is happening like, BT (VOIP), BT (Multimedia Service), WiFi router, WiFi offload, GNSS and time domain multiplexing assistance information. The Time Domain Multiplexing (TDM) assistance information may include Hybrid Automatic Repeat Request (HARQ) bit map pattern or Discontinuous Reception (DRX) parameters.

In a Wi-Fi offload case (Wi-Fi Beacon Reception), a one gap pattern and associated information is also sent specifically for beacon reception as part of TDM assistance data. The gap pattern for WiFi can be handled by providing LTE SFN number, where the latest beacon occurred (at the time of transmitting the indication), Beacon periodicity, and guard period around expected beacon reception to the network entity 104. This information is required as beacon transmission by an access point can be delayed for few milliseconds due to the reason that the medium was not free. Upon reception of this information, the network entity 104 can try not to schedule LTE uplink data in those subframes which correspond to expected beacon reception time and guard period around it. This will ensure that the UE 102 can receive the beacon without any issue.

The UE 102 keeps using the above gap pattern for WiFi beacon handling. However, it is possible that, because of some time drift caused by clock misalignment or other factors, over a period of time beacon reception expected time might fall outside the negotiated beacon reception gap pattern. Whenever the UE 102 experiences such situation then that situation can be used as a trigger criterion to transmit indication informing in-device coexistence interference to the network entity 104. The indication can contain FDM assistance data and /or TDM assistance data for normal WiFi data operation and/or beacon handling related parameter for gap pattern and specially LTE Super Frame Number (SFN), where the last beacon reception was received by the WiFi. However, in the portable router case (e.g., a Wi-Fi Beacon transmission), there is no need for any special gap pattern. As the UE 102 acts as an access point, the UE 102 can delay the beacon transmission to closest LTE uplink or if at all the UE 102 has to perform the beacon transmission which is falling in LTE DL then also the UE 102 will transmit the beacon assuming that beacon transmission duration is of the few microsecond order which may corresponds to one or two LTE OFDM symbol. Accordingly, even if one or two OFDM symbols are corrupted, channel coding and HARQ procedure will help in recovering the data.

In various embodiments, the user equipment 102 sets a prohibit timer after reporting the interference information associated with the LTE carrier frequencies to the network entity 104. In various embodiments, the user equipment 102 defers re-transmission of the same or different interference information associated with the LTE carrier frequencies to the network entity 104 until the expiry of the prohibit timer. For example, if the user equipment 102 has transmitted the interference information to the network entity 104 and has received no response from the network entity 104, the user equipment 102 waits until the expiry of the prohibit timer for the response from the network entity 104 and re-transmits the same or different interference information to the network entity 104 upon expiry of the prohibit timer.

At operation 212, the network entity 104 determines a method for mitigating the in-device coexistence interference associated with the LTE carrier frequencies based on the interference information. At operation 214, the network entity 104 configures the determined method to mitigate the in-device coexistence interference to the user equipment 102. In various embodiments, the network entity 104 configures measurement restriction pattern(s) for Radio Link Monitoring (RLM) measurements, Radio Resource Management (RRM) measurements for mobility and Channel State Information (CSI) measurements. In various embodiments, the user equipment 102 derives the measurement pattern(s) by itself for restricting the above said measurements so that they are free from in-device interference and are further used for subsequent RLF and handover procedure respectively.

Based on the configured method, in one embodiment of the present disclosure, the user equipment 102 performs measurements on the configured measurement objects during the LTE active time such that the measurements are performed without the in-device coexistence interference. In another embodiment of the present disclosure, the user equipment 102 performs measurements on the configured measurement objects during the LTE inactive time such that the measurements are performed without the in-device coexistence interference. In another embodiment of the present disclosure, the user equipment 102 performs transmission and reception on the non-LTE frequencies during the LTE inactive time. In this embodiment, the user equipment 102 denies transmission on the non-LTE frequency when the measurements are performed on LTE frequencies associated with the configured measurement objects during the LTE inactive time.

Alternatively, the network entity 104 may transmit a reject message in response to the indication sent by the UE 102 that the LTE carrier frequencies associated with the measurement objects are affected by the in-device coexistence interference.

Figure 3:
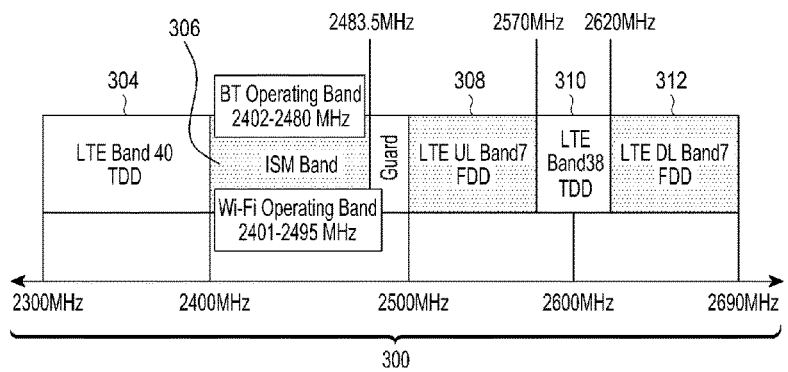
FIG. 3 illustrates interference scenarios of different frequencies in a user equipment when LTE and non-LTE operations are carried out simultaneously according to an embodiment of the present disclosure.

FIG. 3 illustrates interference scenarios of different frequencies in a user equipment when LTE and non-LTE operations are carried out simultaneously according to an embodiment of the present disclosure.

Referring to FIG. 3, based on the interference scenario, the user equipment 102 can determine the DOI. Consider that, the LTE module 108 and the non-LTE module 112 simultaneously transmits and receives over an LTE carrier frequency 310 corresponding to a measurement object and non-LTE carrier frequency 306, respectively. It can be seen that, the frequency separation between the LTE carrier frequency 310 and the non-LTE frequency 306 is around 86.5 MHz. Since the frequency separation is more than 50 MHz, during simultaneous operation of the LTE module 108 on the LTE carrier frequency 310 and the non LTE module 112 on the non LTE frequency 306, the LTE frequency 310 and the non-LTE frequency 306 do not interfere with each other.

However, if the operation of the LTE module 108 is configured with a measurement object on the LTE carrier frequency 304, the simultaneous operation of the LTE module 108 on the LTE carrier frequency 304 and the non-LTE module 112 on the non-LTE frequency 306 results in interference between the LTE carrier frequency 304 and the non-LTE carrier frequency 306. In this case, the LTE frequency 304 and the non-LTE frequency 306 are both victims of the in-device coexistence interference. The non-LTE module 112 operating on the non-LTE frequency 306 gets interfered with the transmission of LTE module 108 on the LTE carrier frequency 308, thereby leading to the in-device coexistence interference scenario where the non-LTE frequency 306 is victim of the in-device coexistence interference. Therefore, the user equipment 102 determines the direction of in-device coexistence interference based on the interference scenario and identifies a victim of in-device coexistence interference. For example, the UE 102 may indicate the direction of interference to the network entity 104 by setting a value in the interference information. The value comprises 'EUTRA', 'other', and 'both', where the value 'EUTRA' implies the victim of in-device coexistence interference is the LTE radio technology, the value 'other' implies the victim of in-device coexistence interference is non-LTE radio technology, and the value 'both' implies the LTE radio technology and non-LTE radio technology are victims of the in-device coexistence interference. Accordingly, the network entity 104 ascertains the direction of interference based on the value set in the interference information.

FIG. 4 illustrates one of trigger criterions configured to determine presence of in-device coexistence interference in a user equipment according to an embodiment of the present disclosure.

Referring to FIG. 4, a graph where blocks 402 denote collisions between an ISM operation and an LTE operation in a defined time span or window is illustrated. For example, the window can be a moving window over which the criterion is to be satisfied. The criterion includes a threshold number of collisions within a time window 406. When the criterion is satisfied, the instance can be treated as one trigger for reporting in-device coexistence interference to the network entity 104. In an embodiment of the present disclosure, the time window 406 is determined during a negotiation between the network entity 104 and the user equipment 102.

Referring to FIG. 4, the number of collisions is shown as six. However, any number of collisions can be assigned as a threshold value. On the basis of these reports from the user equipment 102, the network entity 104 can observe implementation dependent time interval to determine whether the in-device coexistence interference is severe or not for the LTE module 108 or the non-LTE module 112 to operate simultaneously.

In another embodiment of the present disclosure, other conditions to determine presence of interference are provided. The other conditions include one of number of Cyclic Redundancy Check (CRC) errors, De-sensing of receiver, LTE Tx De-sensing the ISM reception, and ISM transmission De-sensing the LTE reception. For example, De-sensing trigger criterion can be evaluated by defining a threshold for De-sense, measuring the number of such De-sensing happening over a time window and providing working conditions of the LTE module 108 and the non-LTE module 112 to the network entity 104. If there are more than a fixed number of De-sensing in a window, then the trigger condition is said to be satisfied.

The working conditions may include non-LTE operating frequency and/or closest frequency towards the LTE operation, LTE operating frequency, LTE transmission and reception power information, non-LTE transmission and reception power information, radio frequency filter mask specifics and the use case scenario in which the in-device coexistence interference is detected like BT (VOIP), BT (Multimedia Service), WiFi router, WiFi offload, GNSS. In an embodiment of the present disclosure, based on such information and working conditions, the network entity 104 can decide if an in-device coexistence method is to be provided to the UE 102 when the UE 102 indicates that the LTE carrier frequency associated with the measurement object is affected. Further, such information and working conditions can be integrated into the measurement reports for serving cell (e.g., the network entity 104) and neighboring cells (e.g., prospective network entities 104) or using a new report.

FIG. 5 illustrates a trigger criterion configured to determine presence of in-device coexistence interference in a UE according to an embodiment of the present disclosure.

Referring to FIG. 5, the trigger criterion for determining presence of the in-device coexistence interference is based on variation in a Received Signal Strength Indicator (RSSI). The RSSI includes the received power (in watts) observed in Orthogonal Frequency Domain Multiplex (OFDM) symbols in the measurement bandwidth. The OFDM symbols are denoted using reference numerals 512 in FIG. 5. The RSSI fluctuations are denoted as 506 and the RSSI threshold is denoted as 504 in FIG. 5. Furthermore, the RSSI fluctuations 506 in an OFDM symbol exceeding the RSSI threshold 504 is denoted as 502 in FIG. 5.

The measurement bandwidth is determined by the UE 102 based on the affected part of the bandwidth or spanning the whole of the operating band. Further, the measured bandwidth is determined in 'N' number of resource blocks, blocks of radio frequency spectrum in a limited or unlimited time. The limited time is also called as slots 508. The RSSI measurement in the measurement bandwidth include in-device coexistence interference, interference from co-channel serving and non-serving cells, adjacent channel interference, thermal noise, and the like. In a time window 510 comprising several slots 508, the RSSI is measured in all OFDM symbols and when the RSSI fluctuation is above the RSSI threshold 504, then the corresponding symbol's RSSI is said to be affected by in-device coexistence interference denoted as 502 in FIG. 5.

Further, FIG. 5 denotes the effect of in-device radio frequency interference in the UE 102. The affected symbols 502 indicate presence of the in-device coexistence interference over the time-slots 508 while monitoring OFDM symbols. Further, the UE 102 and the network entity 104 may have a set threshold RSSI 504. The fluctuations in RSSI are denoted using reference numeral 506. A sample time window 510 is provided to determine the presence of the in-device coexistence interference in the present embodiment. Hence, whenever RSSI fluctuates beyond the RSSI threshold 504 such OFDM symbols 502 are said to be affected by in-device coexistence interference. When the number of OFDM symbols affected by the in-device coexistence interference crosses a threshold count, then the user equipment 102 reports in-device coexistence interference indication to the network entity 104.

Figure 6A:
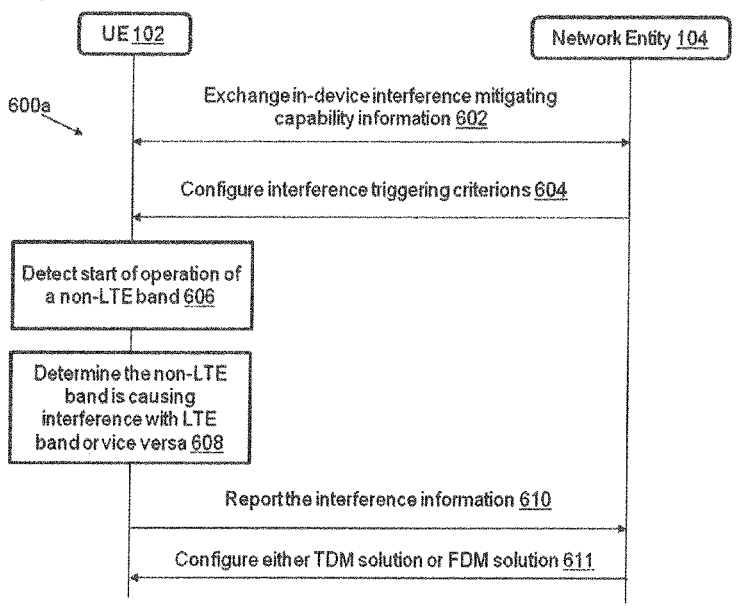
FIG. 6A is a flow diagram illustrating a method for reporting in-device coexistence interference in a user equipment according to an embodiment of the present disclosure.

FIG. 6A is a flow diagram illustrating a method for reporting in-device coexistence interference in a user equipment according to an embodiment of the present disclosure.

Referring to FIG. 6A, at operation 602, the UE 102 and the network entity 104 exchange capability of mitigating in-device coexistence interference. At operation 604, the network entity 104 configures criterions or conditions for detecting detection of in-device coexistence interference at the UE 102. At operation 606, the UE 102 detects start of operation of a non-LTE band 306. For example, the non-LTE band 306 can be an ISM band 306. At operation 608, the UE 102 determines the non-LTE band 306 is causing interference with the LTE band, such as 304 shown in FIG. 3 or vice versa. Thereafter, the UE 102 reports the interference information to the network entity 104, in operation 610. At operation 611, the network entity 104 configures the UE with either a TDM or an FDM for mitigating the in-device coexistence interference, as will be illustrated in FIGS. 6B and 6C.

Figure 6B:
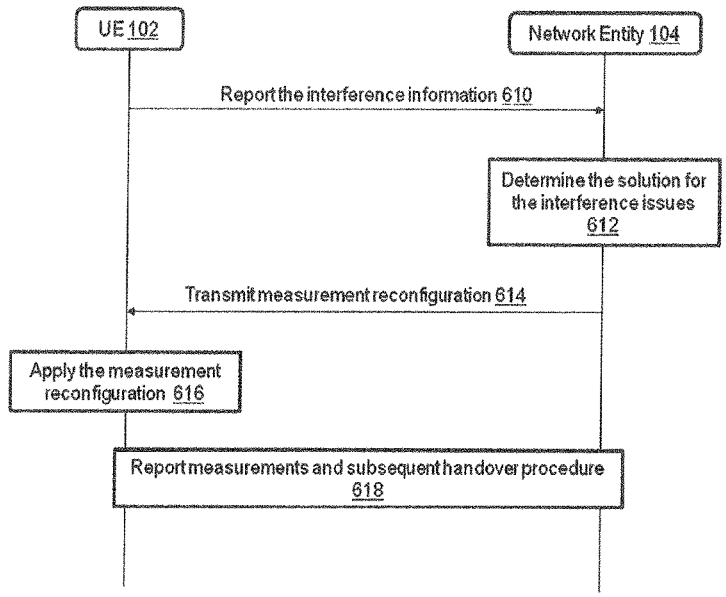
FIG. 6B is a flow diagram illustrating a method for configuring Frequency Division Multiplexing (FDM) for mitigating in-device coexistence interference in a user equipment according to an embodiment of the present disclosure.

FIG. 6B is a flow diagram illustrating a method for configuring a Frequency Division Multiplexing (FDM) for mitigating in-device coexistence interference in a UE according to an embodiment of the present disclosure.

Referring to FIG. 6B, the flow diagram illustrates one of the method that can be provided by the network entity 104 to the UE 102. More specifically, the flow diagram illustrates a method for configuring a FDM type method. For example, if an LTE carrier frequency associated with a measurement object is affected by the in-device coexistence interference, the FDM method may shift the LTE carrier frequency to a new frequency range which can provide the same service without the in-device coexistence interference.

The operations 602 to 608 are similar to the operations discussed in FIG. 6A. At operation 610, the UE 102 reports the in-device coexistence interference information to the network entity 104. The network entity 104, on receiving the information on the in-device coexistence interference, determines the type of method to be provided for mitigating the in-device coexistence interference, at operation 612. At operation 614, the network entity 104 transmits measurement re-configuration to the UE 102. For example, the measurement re-configuration can be one or more frequencies not affected by the in-device coexistence interference that would provide the same service as the LTE carrier frequency that is affected by the in-device coexistence interference. In another example, the measurement re-configuration includes one or more measurement objects, each measurement object represents an LTE carrier frequency.

The network entity 104 configuring one or more frequencies to shift the LTE carrier frequency affected by the in-device coexistence interference is referred to as an FDM type method. The UE 102, at operation 616, applies the measurement re-configuration provided by the network entity 104. Thereafter, after performing measurements on one or more frequencies according to measurement objects, at operation 618, the UE 120 reports measurements for the corresponding measurement objects to assist the network entity 104 to determine whether to perform the handover to reported frequency not affected by the in-device coexistence interference.

Figure 6C:
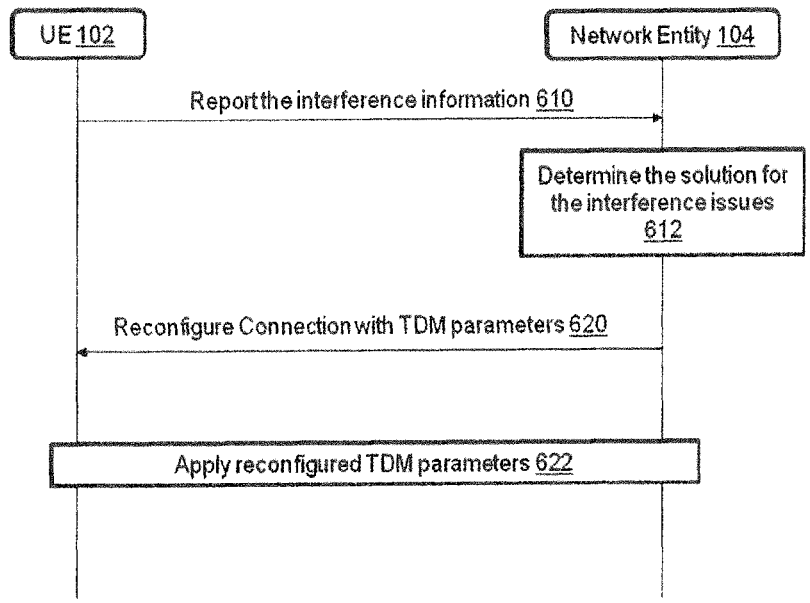
FIG. 6C is a flow diagram illustrating a method for configuring a Time Division Multiplexing (TDM) for mitigating in-device coexistence interference in a user equipment according to an embodiment of the present disclosure.

FIG. 6C is a flow diagram illustrating a method for configuring a Time Division Multiplexing (TDM) for mitigating in-device coexistence interference in a UE according to an embodiment of the present disclosure.

Referring to FIG. 6C, the flow diagram starts at operation 610. The operations 602, 604, 606, and 608 are same as explained in FIG. 6A. At operation 612, the network entity 104 determines a TDM for mitigating the in-device coexistence interference reported by the UE 102. In determining the TDM, the network entity 104 determines a set of parameters based on the information associated with the in-device coexistence interference. The set of parameters may be called as TDM parameters. For example, the TDM parameters may include a set of Discontinuous Reception (DRX) parameters, Hybrid Automatic Repeat Request (HARQ) bitmap reservation to restrict the number of LTE HARQ processes, and interference avoidance bitmaps if the transmission and reception collision avoidance is the purpose. At operation 620, the network entity 104 reconfigures the UE 102 with the TDM parameters. At operation 622, the user equipment 102 applies the reconfigured TDM parameters.

Figure 6D:
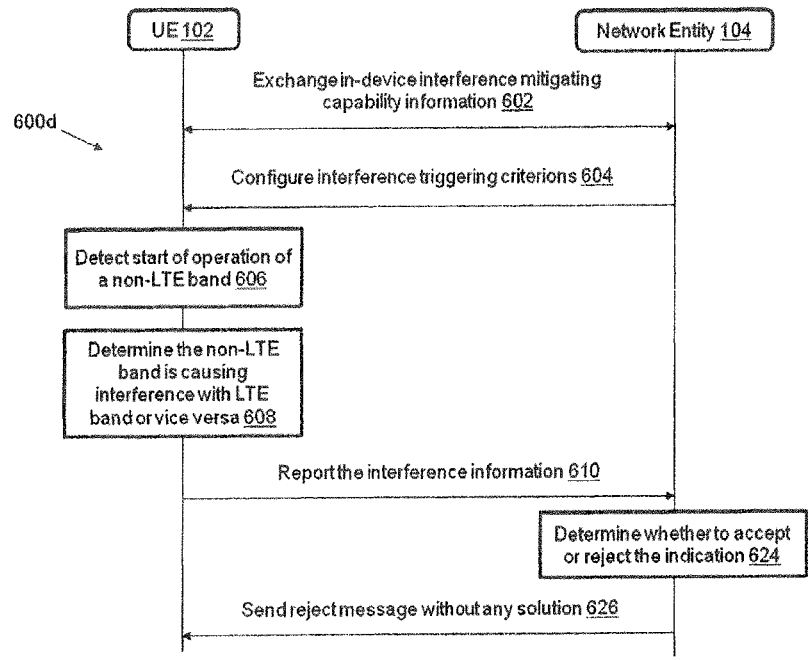
FIG. 6D is a flow diagram illustrating a method for reporting in-device coexistence interference in a user equipment according to an embodiment of the present disclosure.

FIG. 6D is a flow diagram illustrating a method for reporting in-device coexistence interference in a UE according to an embodiment of the present disclosure.

Referring to FIG. 6D, the flow diagram starts with operation 602. At operation 602, the UE 102 and the network entity 104 exchange in-device coexistence interference capability information for mitigating the in-device coexistence interference. At operation 604, the network entity 104 configures interference triggering criterions. At operation 606, the UE 102 detects the start of operation of the non-LTE band. At operation 608, the UE 102 determines that the non-LTE band is causing in-device coexistence interference with the LTE band or vice versa. At operation 610, the UE 102 reports the in-device coexistence interference information to the network entity 104.

At operation 624, the network entity 104 can perform one of the two options under certain conditions. A first option may be to accept the interference information associated with the in-device coexistence interference and provide a method as described in FIG. 6B or FIG. 6C. In certain situation, the network entity 104 may neglect the interference information associated with the in-device coexistence interference. This may happen due to various conditions, such as the network entity 104 is already occupied with such requests, reports that it could not accommodate, and the like. Therefore, the network entity 104 rejects the indication sent by the UE 102 and transmits a reject message without any resolution, at operation 626.

Figure 6E:
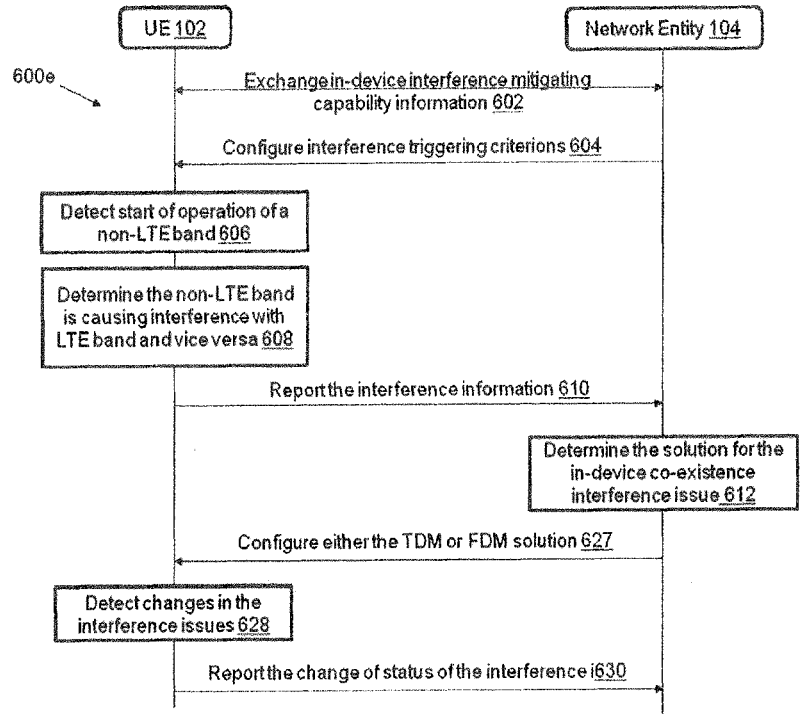
FIG. 6E is a flow diagram illustrating a method for reporting change of status of in-device coexistence interference in a user equipment according to an embodiment of the present disclosure.

FIG. 6E is a flow diagram illustrating a method for reporting change of status of in-device coexistence interference in a user equipment according to an embodiment of the present disclosure.

Referring to FIG. 6E, it can be noted that, the operations 602 to 608 are similar to the operations discussed in FIGS. 6A, 6B, 6C, and 6D. At operation 610, in the present embodiment, the UE 102 reports the in-device coexistence interference to the network entity 104 for providing a suitable method. In an embodiment of the present disclosure, the network entity 104, at operation 627, configures the UE with a TDM or an FDM. At operation 628, the UE 102 detects change in status of the in-device coexistence interference. The change in status may include an indication that the in-device coexistence interference is over in the UE 102 or a change in the interference information provided by the UE 102. At operation 630, the UE 102 reports the change in status of the in-device coexistence interference to the network entity 104. When the in-device coexistence interference information is changed, the UE 102 transmits the updated in-device coexistence interference information to the network entity 104.

Figure 7A:
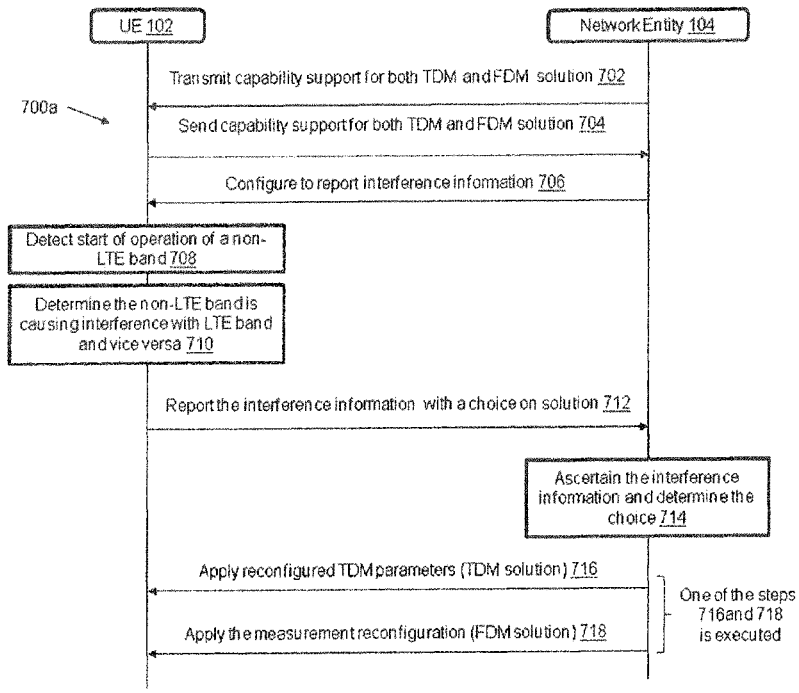
FIG. 7A is a flow diagram illustrating a method for mitigating in-device coexistence interference in a user equipment according to an embodiment of the present disclosure.

FIG. 7A is a flow diagram illustrating a method for mitigating in-device coexistence interference in a UE according to an embodiment of the present disclosure.

Referring to FIG. 7A, at operation 702, the network entity 104 transmits capability support for both TDM and FDM to the UE 102. At operation 704, the UE 102 transmits capability support for both TDM and FDM. At operation 706, the network entity 104 configures the UE 102 for reporting the in-device coexistence interference.

At operation 708, the UE detects start of operation of a non-LTE band. At operation 710, the UE 102 determines that the non-LTE band is causing interference to the LTE band or vice versa. At operation 712, the UE 102 reports in-device coexistence interference with a choice of a method. At operation 714, the network entity 104 ascertains the interference information and determines the choice indicated by the UE 102.

In an embodiment of the present disclosure, the interference information specifically includes a measurement object identifier of the at least one carrier frequency, the DOI, and time domain multiplexing assistance information including HARQ bit map pattern, and DRX parameters.

In an embodiment of the present disclosure, the network entity 104 and the UE 102 applies reconfigured TDM parameters to the UE 102 to mitigate the in-device coexistence interference, at operation 716 if the UE chooses TDM. In another embodiment of the present disclosure, the network entity 104 and the UE 102 applies measurement reconfiguration (FDM) to mitigate the in-device coexistence interference, at operation 718 if the UE preferred choice is FDM. Both, FDM and TDM are discussed in FIGS. 6B and 6C.

Figure 7B:
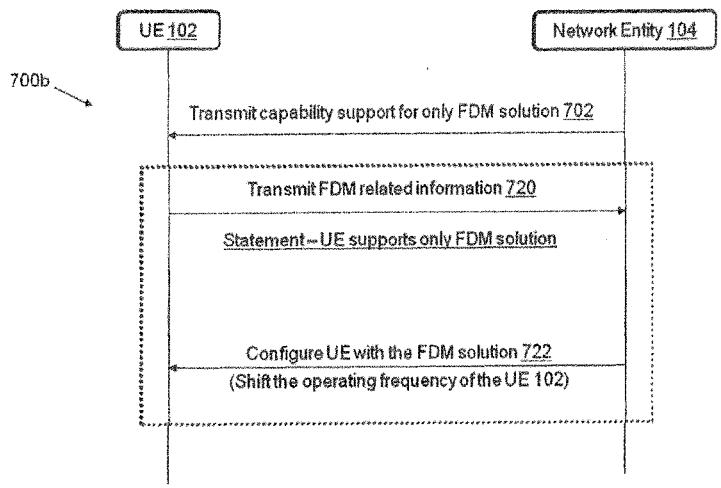
FIG. 7B is a flow diagram illustrating a method for mitigating in-device coexistence interference in a user equipment according to an embodiment of the present disclosure.

FIG. 7B is a flow diagram illustrating a method for mitigating in-device coexistence interference in a UE according to an embodiment of the present disclosure.

Referring to FIG. 7B, the flow diagram illustrates an embodiment where the UE 102 supports FDM to be provided by the network entity 104. At operation 702, the network entity 104 transmits capability support for FDM to the UE 102. At operation 720, the UE 102 transmits interference information related to FDM to the network entity 104. The reason behind the transmission of the FDM related information is the network entity 104 is capable of supporting FDM to mitigate the in-device coexistence interference. At operation 722, the network entity 104 configures the UE 102 with the determined FDM to mitigate the in-device coexistence interference. For example, one of the FDM methods that the network entity 104 can provide to the UE 102 is shifting the LTE carrier frequency that is affected by the in-device coexistence interference to a range of frequency to prevent interference.

Figure 7C:
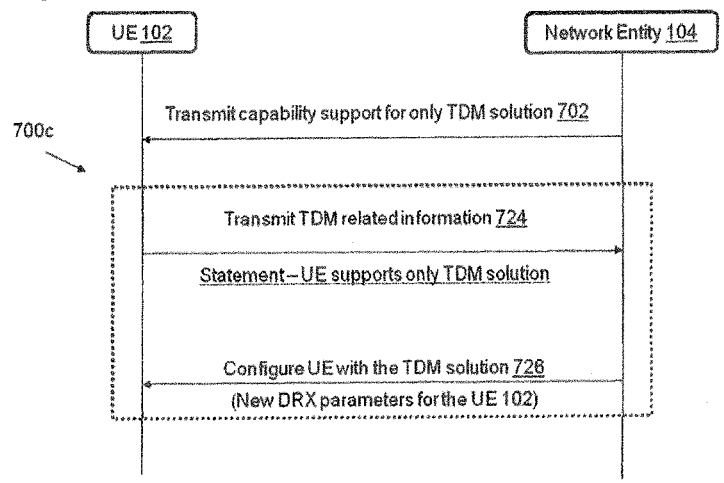
FIG. 7C is a flow diagram illustrating a method for mitigating in-device coexistence interference in a user equipment according to an embodiment of the present disclosure.

FIG. 7C is a flow diagram illustrating a method for mitigating in-device coexistence interference in a UE according to an embodiment of the present disclosure.

Referring to FIG. 7C, at operation 702, the network entity 104 transmits capability support for TDM to the UE 102. At operation 724, the UE 102 transmits interference information related to TDM to the network entity 104. The reason for transmitting TDM related information to the network entity 104 is that the network entity 104 supports TDM to mitigate the in-device coexistence interference. At operation 726, the network entity 104 configures the UE 102 with the determined TDM method to mitigate the in-device coexistence interference. For example, the TDM method determined by the network entity 104 can be newly configured DRX parameters of the UE 102.

Figure 7D:
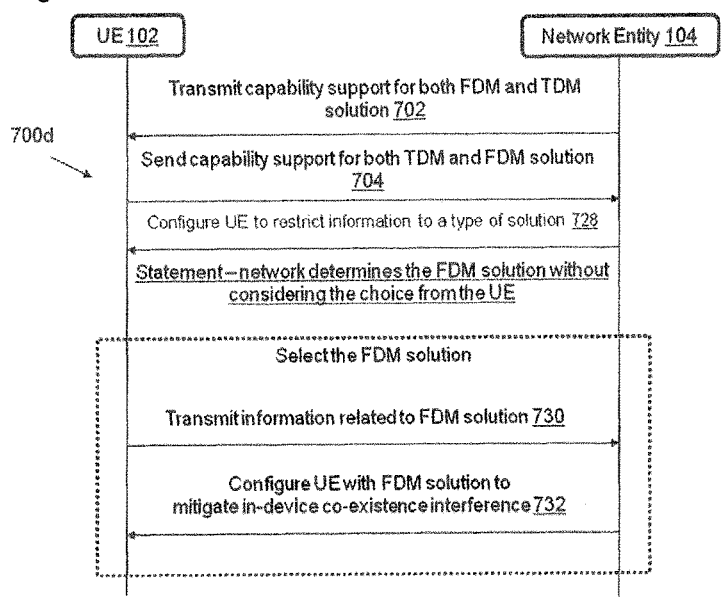
FIG. 7D is a flow diagram illustrating a method for mitigating in-device coexistence interference in a user equipment according to an embodiment of the present disclosure.

FIG. 7D is a flow diagram illustrating a method for mitigating in-device coexistence interference in a UE according to an embodiment of the present disclosure.

Referring to FIG. 7D, at operation 702, the network entity 104 transmits capability support for both TDM and FDM to the UE 102. At operation 704, the UE 102 transmits capability support for both TDM solution and FDM. At operation 728, the network entity 104 configures the UE 102 to restrict in-device coexistence interference to a type of method (e.g., FDM). It can be noted that, the network entity 104 does not consider the UE choice while configuring the method. At operation 730, the UE 102 transmits the interference information related to an FDM for mitigating the in-device coexistence interference to the network entity 104. At operation 732, the network entity 104 configures the UE 102 with the FDM method to mitigate the in-device coexistence interference.

Figure 7E:
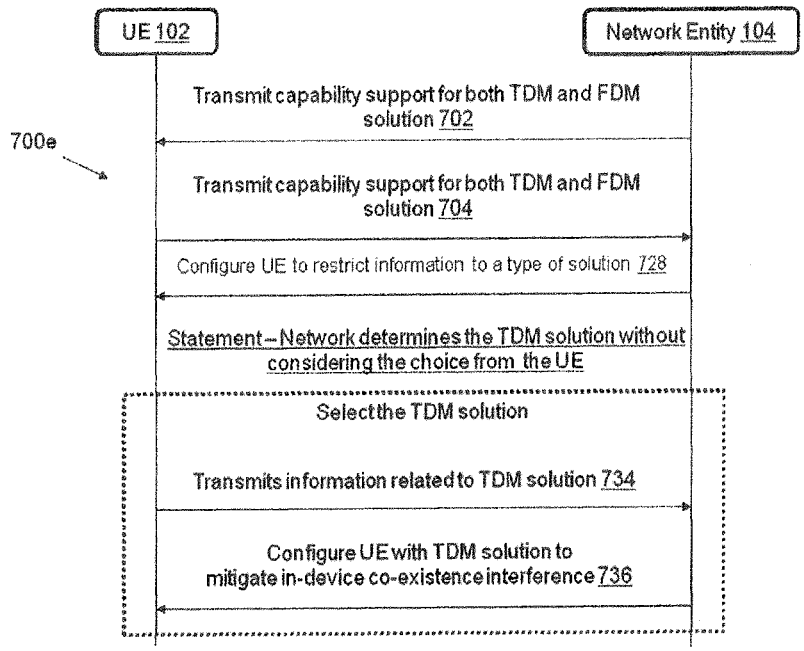
FIG. 7E is a flow diagram illustrating a method for mitigating in-device coexistence interference in a user equipment according to an embodiment of the present disclosure.

FIG. 7E is a flow diagram illustrating a method for mitigating in-device coexistence interference in a UE according to an embodiment of the present disclosure.

Referring to FIG. 7E, at operation 702, the network entity 104 transmits capability support for both TDM and FDM to the UE 102. At operation 704, the UE 102 transmits capability support for both TDM and FDM. At operation 728, the network entity 104 configures the UE 102 to restrict in-device coexistence interference to a type of method (e.g., TDM). It can be noted that the network entity 104 does not consider the UE choice while configuring the method. At operation 734, the UE 102 transmits the interference information related to TDM for mitigating the in-device coexistence interference to the network entity 104. At operation 736, the network entity 104 configures the UE 102 with the TDM method to mitigate the in-device coexistence interference.

Figure 7F:
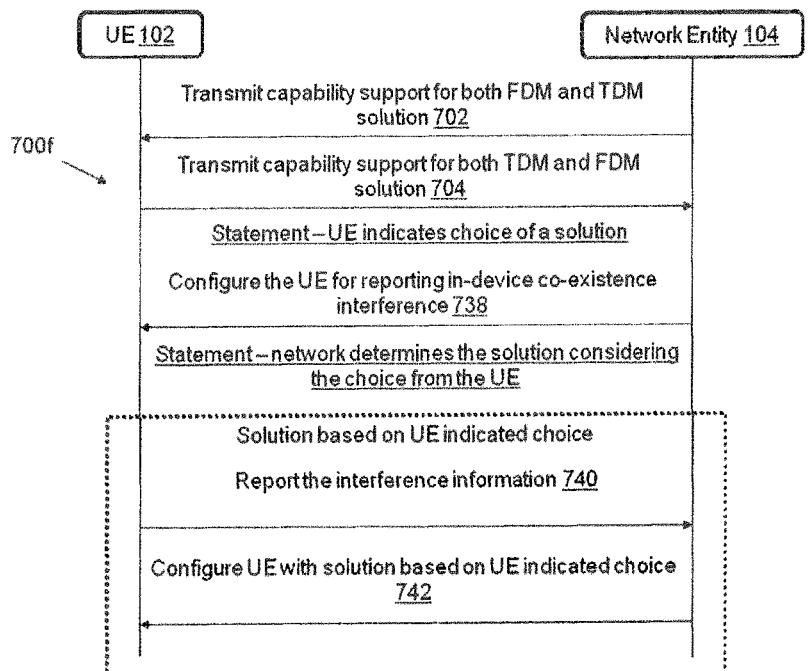
FIG. 7F is a flow diagram illustrating a method for mitigating in-device coexistence interference in a user equipment according to an embodiment of the present disclosure.

FIG. 7F is a flow diagram illustrating a method for mitigating in-device coexistence interference in a UE according to an embodiment of the present disclosure.

Referring to FIG. 7F, at operation 702, the network entity 104 transmits capability support for both TDM and FDM to the UE 102. At operation 704, the UE 102 transmits capability support for both TDM and FDM and indicates a choice of the method. At operation 738, the network entity 104 configures the UE 102 for reporting the in-device coexistence interference considering the choice of method that the UE 102 has indicated. At operation 740, the UE 102 reports the in-device coexistence interference information to the network entity 104. At operation 742, the network entity 104 configures the UE with a method for mitigating in-device coexistence interference based on UE indicated choice.

Figure 8A:
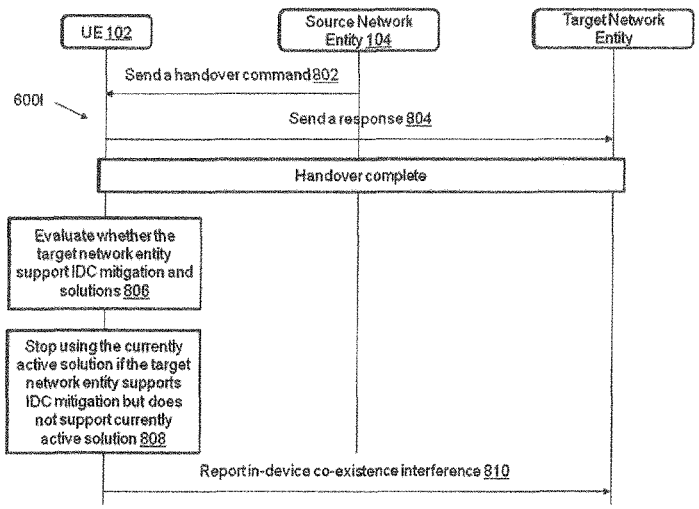
FIG. 8A is a flow diagram illustrating a behavior of a user equipment upon handover of a wireless connection from a source network entity to a target network entity according to an embodiment of the present disclosure.

FIG. 8A is a flow diagram illustrating a behavior of a user equipment upon handover of a wireless connection from a source network entity to a target network entity according to an embodiment of the present disclosure.

Referring to FIG. 8A, at operation 802, the network entity 104 (hereinafter referred to as source network entity) transmits a handover command for performing handover of wireless connection to a network entity (hereinafter referred to as target network entity). At operation 804, the user equipment 102 transmits a response to the handover command to the target network entity 104.

At operation 806, the user equipment 102 evaluates whether the target network entity supports in-device coexistence interference mitigation and supports the currently configured method. It can be noted that, the support for in-device coexistence interference mitigation and the methods supported by the target network can be derived either from the handover command or System Information Blocks (SIBs) associated with the target cells. In addition, when the handover of the ongoing wireless connection occurs, the UE 102 evaluates existence of the in-device coexistence interference. The evaluation may also be triggered based on the parameters for in-device interference indication trigger criterion as provided by the source network entity, the target network entity, UE implementation, Standard defined, criterion related to in-device interference is over, and/or capabilities difference between UE and network entity which may differ in in-device coexistence interference mitigation support and the methods supported. Alternatively, the evaluation for in-device coexistence interference may also be triggered based on the parameters in the handover command. For example, the handover command may include information which may request UE to restart the in-device coexistence interference negotiation procedure. With this information, the target network entity will get a better picture of the current status of the in-device coexistence interference.

If the target network entity supports in-device coexistence interference but does not support currently active method, at operation 808, the UE 102 stops using the currently active method. At operation 810, the UE 102 reports the presence of in-device coexistence interference to the target network entity so that the target network entity provides the supported method for resolving the in-device coexistence interference.

Figure 8B:
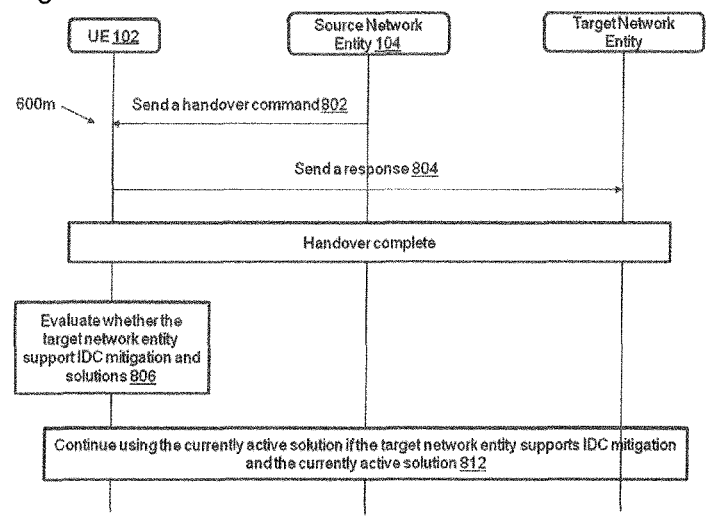
FIG. 8B is a flow diagram illustrating a behavior of a user equipment upon handover of a wireless connection from a source network entity to a target network entity according to an embodiment of the present disclosure.

FIG. 8B is a flow diagram illustrating a behavior of a user equipment upon handover of a wireless connection from a source network entity to a target network entity according to an embodiment of the present disclosure.

Referring to FIG. 8B, if the target network entity supports in-device coexistence interference and the currently active method, at operation 812, the UE 102 continues using the currently active method.

Figure 8C:
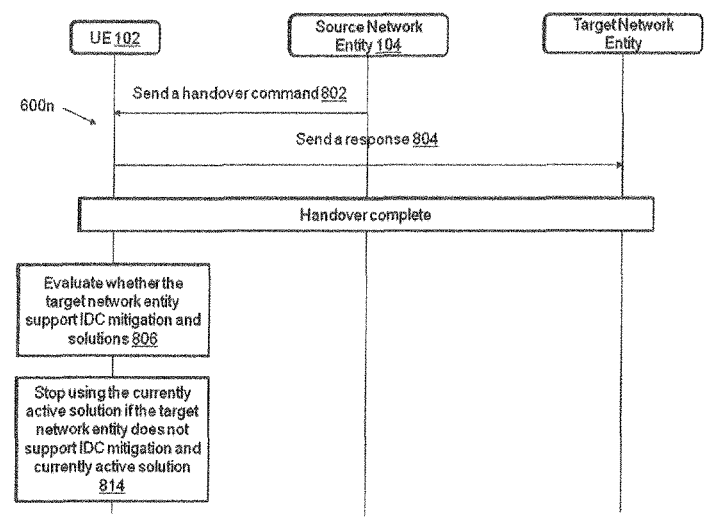
FIG. 8C is a flow diagram illustrating a behavior of a user equipment upon handover of a wireless connection from a source network entity to a target network entity according to an embodiment of the present disclosure.

FIG. 8C is a flow diagram illustrating a behavior of a user equipment upon handover of a wireless connection from a source network entity to a target network entity according to an embodiment of the present disclosure.

Referring to FIG. 8C, if the target network entity does not support in-device coexistence interference and the currently active method, at operation 814, the UE 102 stops using the currently active method.

Figure 9:
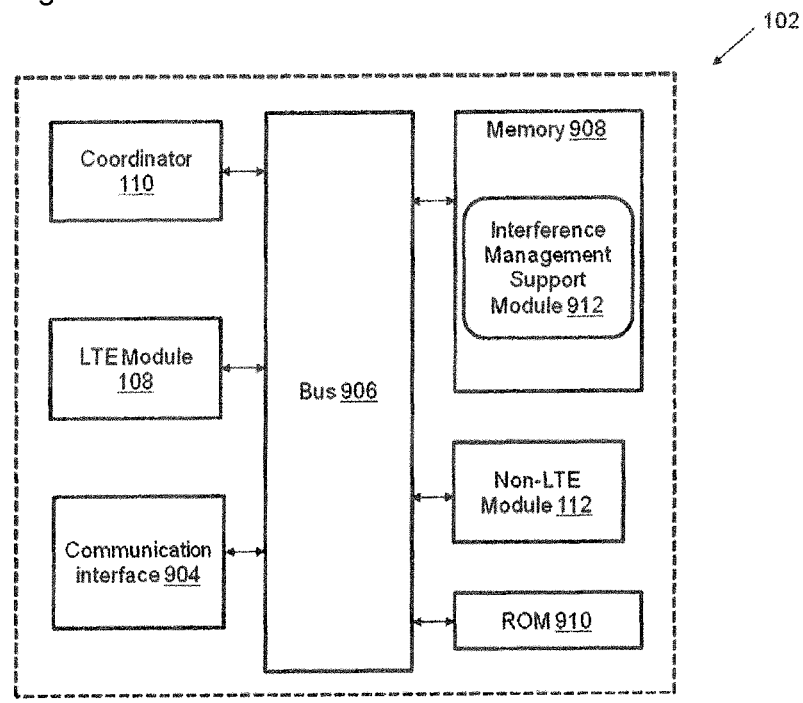
FIG. 9 is a block diagram illustrating a user equipment according to an embodiment of the present disclosure.

FIG. 9 is a block diagram illustrating a UE according to an embodiment of the present disclosure.

Referring to FIG. 9, the UE 102 includes the LTE module 108, the coordinator 110, the non-LTE module 112, a communication interface 904, a bus 906, a memory 908, and a Read Only Memory (ROM) 910.

The coordinator 110, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The coordinator 110 may also include embedded controllers, such as generic or programmable logic devices or arrays, application specific integrated circuits, single-chip computers, smart cards, and the like.

The memory 908 and the ROM 910 may be volatile memory and non-volatile memory. The memory 908 includes an interference management support module 912 configured to handle in-device coexistence interference between LTE carrier frequency corresponding to measurement objects and non-LTE frequency in the UE 102. Further, the interference management support module 912 is configured to perform all the operations performed by the UE 102 from FIGS. 2, and 6A, 6B, 6C, 6D, 6E, 7A, 7B, 7C, 7D, 7E, 7F, 8A, 8B, and 8C. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like. The interference management support module 912 may be stored in the form of machine-readable instructions on any of the above-mentioned storage media. The machine-readable instructions stored on the above mentioned storage media, when executed by the coordinator 110, cause the coordinator 110 of the UE 102 to perform one or more operations of FIGS. 2, and 6A, 6B, 6C, 6D, 6E, 7A, 7B, 7C, 7D, 7E, 7F, 8A, 8B, and 8C.

The bus 906 acts as interconnect between various components of the network entity 104. The components, such as the communication interface 904, are well known to the person skilled in the art and hence the explanation is thereof not provided.

Figure 10:
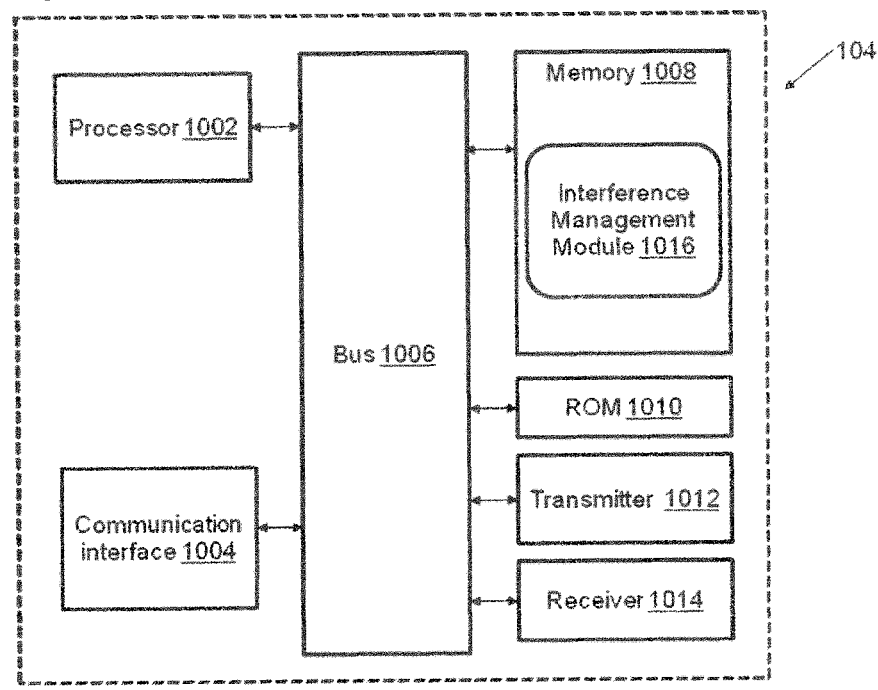
FIG. 10 is a block diagram of a network entity according to an embodiment of the present disclosure.

FIG. 10 is a block diagram of a network entity according to an embodiment of the present disclosure.

Referring to FIG. 10, the network entity 104 includes a processor 1002, a bus 1006, a communication interface 1004, a memory 1008, a ROM 1010, a transmitter 1012, and a receiver 1014.

The processor 1002, as used herein, means any type of computational circuit, or a server or a base station. It may be also embodiment in devices such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1002 may also include embedded controllers, such as generic or programmable logic devices or arrays, application specific integrated circuits, single-chip computers, smart cards, and the like.

The memory 1008 and the ROM 1010 may be a volatile memory and a non-volatile memory. The memory 1008 includes an interference management module 1016 configured to mitigate the in-device coexistence interference present in the UE 102. Further, the interference management module 1016 is configured to perform all the operations performed by the network entity 104 in the FIGS. 2 and 6A, 6B, 6C, 6D, 6E, 7A, 7B, 7C, 7D, 7E, 7F, 8A, 8B, and 8C. A variety of computer-readable storage media may be stored in and accessed from the memory elements. Memory elements may include any suitable memory device(s) for storing data and machine-readable instructions, such as a read only memory, a random access memory, an erasable programmable read only memory, an electrically erasable programmable read only memory, a hard drive, a removable media drive for handling compact disks, digital video disks, diskettes, magnetic tape cartridges, memory cards, Memory Sticks™, and the like. The interference management module 1016 may also be stored in the form of machine-readable instructions on any of the above-mentioned storage media. The machine-readable instructions stored on the above mentioned storage media, when executed by the processor 1002, cause the processor 1002 to perform one or more operations of FIGS. 2, and 6A, 6B, 6C, 6D, 6E, 7A, 7B, 7C, 7D, 7E, 7F, 8A, 8B, and 8C.

The machine-readable instructions may also be stored on a computer program, which when executed by the processor 1002, cause the processor 1002 to mitigate the in-device coexistence interference present in the UE 102, according to the teachings and herein described various embodiments of the present subject matter. In one embodiment, the computer program may be included on a Compact Disk-Read Only Memory (CD-ROM) and loaded from the CD-ROM to a hard drive in the non-volatile memory.

The bus 1006 acts as an interconnect between various components of the network entity 104. The components, such as the transmitter 1012 and the receiver 1014, the communication interface 1004, and the like, are well known to one of ordinary skill in the art and hence the explanation is thereof not provided.

While the present disclosure been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for handling an in-device co-existence (IDC) problem in a user equipment, the method comprising:
   determining whether at least one long term evolution (LTE) carrier frequency for which a measurement object is configured is affected by the IDC problem; and
   transmitting a message including information associated with the at least one LTE carrier frequency affected by the IDC problem, time domain multiplexing (TDM) based assistance information including a discontinuous reception (DRX) parameter, and frequency division multiplexing (FDM) information, if the at least one LTE carrier frequency for which the measurement object is configured is affected by the IDC problem.

2. The method of claim 1, further comprising:
   receiving a handover command from a network entity.

3. The method of claim 2, further comprising;
   transmitting a handover response message to a target network entity.

4. An apparatus for handling an in-device co-existence (IDC) problem in a user equipment, the apparatus comprising:
   a controller configured to determine whether at least one long term evolution (LTE) carrier frequency for which a measurement object is configured is affected by the IDC problem; and
   a transmitter configured to transmit a message including information associated with the at least one LTE carrier frequency affected by the IDC problem, time domain multiplexing (TDM) based assistance information including a discontinuous reception (DRX) parameter, and frequency division multiplexing (FDM) information, if the at least one LTE carrier frequency for which the measurement object is configured is affected by the IDC problem.

5. The apparatus of claim 4, wherein the controller is further configured to receive a handover command from a network entity.

6. The apparatus of claim 5, wherein the controller is further configured to transmit a handover response message to a target network entity.

7. An apparatus for handling an in-device co-existence (IDC) problem in a network entity, the apparatus comprising:
   a controller configured to receive, from a user equipment, a message including information associated with at least one long term evolution (LTE) carrier frequency affected by the IDC problem, time domain multiplexing (TDM) based assistance information including a discontinuous reception (DRX) parameter, and frequency division multiplexing (FDM) information, if the at least one LTE carrier frequency for which a measurement object is configured is affected by the IDC problem; and
   a transceiver configured to transmit or receive a signal.

8. The apparatus of claim 7, wherein the controller is further configured to transmit a handover command to the user equipment.

9. The apparatus of claim 8, wherein the controller is further configured to:
   receive a handover response message from the user equipment, and
   apply configuration information with a target network entity.

10. A method for handling an in-device co-existence (IDC) problem in a network entity, the method comprising:
    receiving, from a user equipment, a message including information associated with at least one long term evolution (LTE) carrier frequency affected by the IDC problem, time domain multiplexing (TDM) based assistance information including a discontinuous reception (DRX) parameter, and frequency division multiplexing (FDM) information, if the at least one LTE carrier frequency for which a measurement object is configured is affected by the IDC problem.

11. The method of claim 10, further comprising:
transmitting a handover command to the user equipment.

12. The method of claim 11, further comprising;
receiving a handover response message from the user equipment; and
applying configuration information with a target network entity.

* * * * *